(12) United States Patent
Anders et al.

(10) Patent No.: US 12,286,163 B2
(45) Date of Patent: Apr. 29, 2025

(54) STEERING RACK AND METHOD OF MANUFACTURING THE SAME

(71) Applicant: STEERING SOLUTIONS IP HOLDING CORPORATION, Saginaw, MI (US)

(72) Inventors: William S. Anders, Merrill, MI (US); David E. King, Freeland, MI (US); Kevin H. Marseilles, Frankenmuth, MI (US); Paul T. Duvendack, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 1056 days.

(21) Appl. No.: 15/231,924

(22) Filed: Aug. 9, 2016

(65) Prior Publication Data

US 2018/0043925 A1   Feb. 15, 2018

(51) Int. Cl.
*B62D 3/12*     (2006.01)
*B21D 53/88*    (2006.01)
*B21K 1/76*     (2006.01)

(52) U.S. Cl.
CPC ............ *B62D 3/126* (2013.01); *B21D 53/88* (2013.01); *B21K 1/767* (2013.01)

(58) Field of Classification Search
CPC ... B62D 3/126; B21K 1/767; Y10T 29/49472; Y10T 29/49474
See application file for complete search history.

(56) References Cited

U.S. PATENT DOCUMENTS

| | | | | |
|---|---|---|---|---|
| 4,641,406 A * | 2/1987 | Rogers | | B23P 15/14 29/893.3 |
| 4,646,554 A * | 3/1987 | Wallis | | B21J 9/025 29/893.3 |
| 4,991,421 A * | 2/1991 | Simon | | B21C 23/14 29/893.35 |
| 6,427,552 B1 * | 8/2002 | Sahr | | B62D 3/123 267/164 |
| 6,543,569 B1 * | 4/2003 | Shimizu | | B21K 1/767 180/444 |

(Continued)

FOREIGN PATENT DOCUMENTS

AT           514503 A1 *  1/2015  ............ B21K 1/767
CN       101547759 B       3/2013

(Continued)

OTHER PUBLICATIONS

Machine Translation of the Description for JPS60108136A (Year: 1985).*

(Continued)

*Primary Examiner* — Michael W Hotchkiss
(74) *Attorney, Agent, or Firm* — Dickinson Wright PLLC

(57) ABSTRACT

A steering rack includes an elongate member, a plurality of steering rack teeth, and a ramp function. The elongate member has a first portion disposed opposite a second portion. The plurality of steering rack teeth are cut and formed into the first portion. Each tooth of the plurality of steering rack teeth have a substantially constant height across a length of the elongate member. The ramp function is formed into the second portion of the elongate member.

3 Claims, 3 Drawing Sheets

(56) References Cited

U.S. PATENT DOCUMENTS

| | | | | |
|---|---|---|---|---|
| 6,601,428 | B1 * | 8/2003 | Brenner | B21K 1/767 |
| | | | | 29/893.34 |
| 7,654,165 | B2 * | 2/2010 | Roeske | B21K 1/768 |
| | | | | 74/120 |
| 7,950,153 | B2 * | 5/2011 | Dohmann | B21J 5/12 |
| | | | | 29/893.34 |
| 8,661,677 | B2 * | 3/2014 | Omi | B21J 9/025 |
| | | | | 29/893.34 |
| 9,149,860 | B2 * | 10/2015 | Dohmann | B21J 13/02 |
| 9,914,166 | B2 * | 3/2018 | Hagiwara | F16H 55/26 |
| 10,392,046 | B2 * | 8/2019 | Mizushima | B21K 1/767 |
| 2002/0073793 | A1 * | 6/2002 | Tsubouchi | B62D 3/126 |
| | | | | 74/422 |
| 2010/0162843 | A1 * | 7/2010 | Kobayashi | B21J 5/12 |
| | | | | 72/377 |
| 2012/0137747 | A1 * | 6/2012 | Cornish | B21J 5/008 |
| | | | | 72/352 |
| 2013/0042662 | A1 * | 2/2013 | Cornish | B62D 3/126 |
| | | | | 72/357 |
| 2013/0192330 | A1 * | 8/2013 | Dohmann | B21J 13/025 |
| | | | | 72/352 |
| 2015/0298721 | A1 * | 10/2015 | Suzuki | B62D 3/126 |
| | | | | 74/457 |
| 2019/0047609 | A1 * | 2/2019 | Muzushima | F16H 19/04 |

FOREIGN PATENT DOCUMENTS

| | | | | |
|---|---|---|---|---|
| CN | 104245182 A | | 12/2014 | |
| DE | 2930917 A1 | | 2/1980 | |
| DE | 4006038 A1 | | 8/1991 | |
| GB | 2026908 A | * | 2/1980 | B21K 1/767 |
| JP | S5773269 A | | 5/1982 | |
| JP | S5881535 A | | 5/1983 | |
| JP | 60108136 A | * | 6/1985 | |
| JP | S60108136 A | | 6/1985 | |
| JP | S61228161 A | | 10/1986 | |
| JP | H02124361 A | | 5/1990 | |

OTHER PUBLICATIONS

AT-514503-A1 machine translation (Year: 2017).*

Chinese Office Action and Search Report from the Chinese Patent Office for CN Application No. 201710676455.9 dated Sep. 30, 2018, 17 pages, English Translation of Office Action Included.

English translation of Office Action regarding related CN App. No. 201710676455.9; issued Jun. 24, 2019; 10 pgs.

English translation of Office Action regarding related DE App. No. 10 2017 117 717.5; issued May 3, 2023.

* cited by examiner

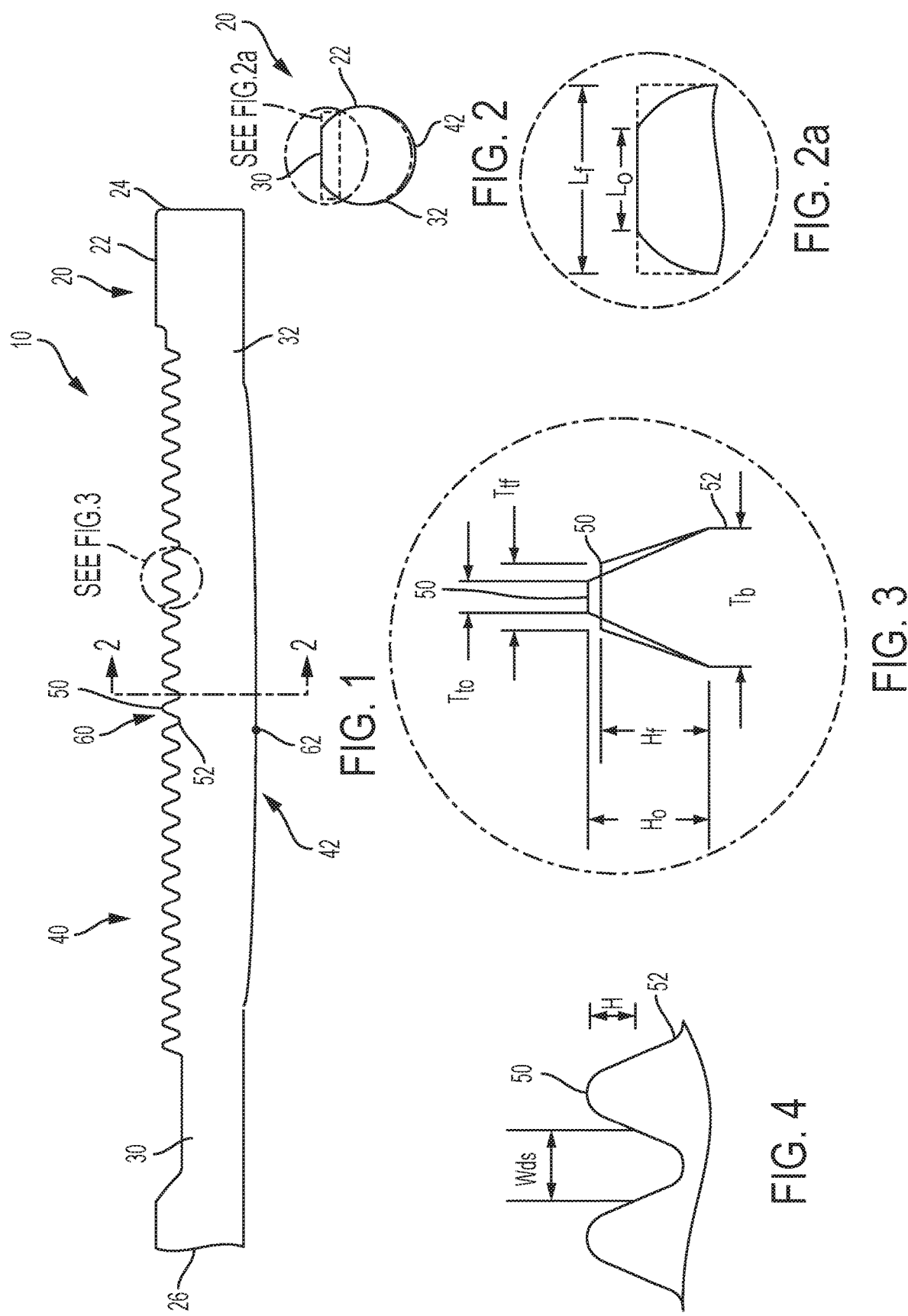

STEERING RACK AND METHOD OF MANUFACTURING THE SAME

BACKGROUND OF THE INVENTION

Some steering racks are provided with a plurality of steering rack teeth that are either machined or warm/hot formed into their desired shape. The current processes to provide the plurality of steering rack teeth may result in dimensional issues that include form and finish errors due to tool wear and dulling, machine setup variation, and heat treat distortion. Additionally, the forming processes may result in high residual stresses that may cause distortion of the plurality of steering rack teeth.

SUMMARY OF THE INVENTION

According to an embodiment of the present disclosure, a method of manufacturing a steering rack is provided. The method includes cutting a plurality of steering rack teeth into a first portion of an elongate member. Each tooth of the plurality of steering rack teeth has a first tooth width and a first tooth height. The method further includes placing the elongate member having the plurality of steering rack teeth into a press. The press has a die and a punch. The die is configured to receive a second portion of the elongate member. The punch is provided with a plurality of tooth cavities that face towards the first portion of the elongate member.

According to another embodiment of the present disclosure, a method of manufacturing a steering rack is provided. The method includes providing an elongate member having a first portion disposed opposite the second portion. The method further includes cutting a plurality of steering rack teeth into the first portion of the elongate member. Each tooth of the plurality of steering rack teeth has a first width, a first height, and a first profile. The method still further includes upsetting the plurality of steering rack teeth with a press. The plurality of steering rack teeth are upset such that each tooth of the plurality of steering rack teeth has a second width greater than the first width, a second height less than the first height, and a second profile different from the first profile.

According to yet another embodiment of the present disclosure a steering rack is provided. The steering rack includes an elongate member, a plurality of steering rack teeth, and a ramp function. The elongate member has a first portion disposed opposite a second portion. The plurality of steering rack teeth are cut and formed into the first portion. Each tooth of the plurality of steering rack teeth has a substantially constant height across a length of the elongate member. The ramp function is formed into the second portion of the elongate member.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

FIG. 1 is a partial perspective view of a steering rack;
FIG. 2 is a perspective view of a tooth of the plurality of steering rack teeth prior to forming and after forming;
FIG. 2a is a perspective view of a first portion of an elongate member body of the steering rack;
FIG. 3 is a section view of a rack tooth showing a tooth shape prior to forming and after forming;
FIG. 4 is a partial perspective view of adjacent teeth of the plurality of steering rack teeth after forming.

DETAILED DESCRIPTION

Figure 5:
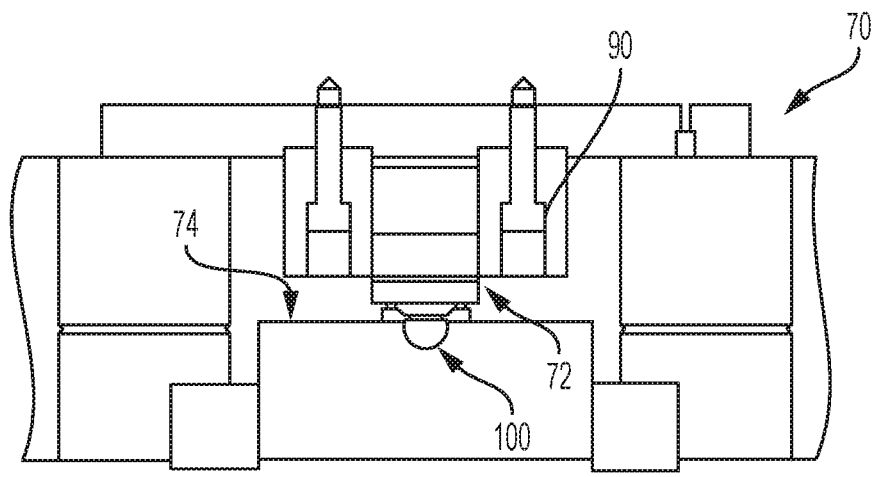
FIG. 5 is an illustrative view of a press.

The present disclosure relates to a steering rack and a method of manufacturing a steering rack.

Referring now to the Figures, where the present disclosure will be described with reference to specific embodiments, without limiting same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Referring to FIG. 1, a partial perspective view of a steering rack 10 is shown. The steering rack 10 is formed from an elongate member 20 having an elongate member body 22 extending along an axis between a first elongate member end 24 and a second elongate member end 26. The elongate member 20 may be but need not be a cylindrical bar.

The elongate member body 22 includes a first portion 30 and a second portion 32. The first portion 30 is disposed opposite the second portion 32. The first portion 30 includes a plurality of steering rack teeth 40. The plurality of steering rack teeth 40 are disposed proximate the first elongate member end 24. The plurality of steering rack teeth 40 are spaced apart from the first elongate member end 24. The second portion 32 includes a ramp function 42.

Referring to FIGS. 1-4, the plurality of steering rack teeth 40 are cut and formed into the first portion 30. An initial form of the plurality of steering rack teeth 40 are cut into the first portion 30 of the elongate member body 22 by a cutting process such as broaching, milling, or the like. Each tooth of the initial form of the plurality of steering rack teeth 40 includes a first width, Tto, a first height, Ho, a first profile, a bottom thickness, Tb, and a first tooth length (Lo). In at least one embodiment, each tooth of the initial form of the plurality of steering rack teeth 40 are cut at an angle relative to the axis along which the elongate member 20 extends.

The first width, Tto, is measured at a tip 50 of the tooth of the initial form of the plurality of steering rack teeth 40. The first height, Ho, is measured from the tip 50 of the tooth of the initial form of the plurality of steering rack teeth 40 to a root or base 52 of the initial form of the plurality of steering rack teeth 40. The first profile cut into the plurality of steering rack teeth 40 of the first portion 30 of the elongate member body 22 may include a variable pitch, helix angle, or twist such that the steering rack 10 may have a variable ratio plurality of steering rack teeth or a straight ratio plurality of steering rack teeth.

A final form of the plurality of steering rack teeth 40 are formed into the first portion 30 of the elongate member body 22 by a cold upsetting process. The cold upsetting process forms the initial form of the plurality of steering rack teeth 40 into the final form of the plurality of steering rack teeth 40. The cold upsetting process forms the final form of the plurality of steering rack teeth 40 at ambient shop temperatures thereby avoiding heating the elongate member 20 prior to forming. Each tooth of the final form of the plurality of steering rack teeth 40 after forming includes a second width, Ttf, a second height, Hf, a second profile, a bottom thickness, Tb, and a second tooth length (Lf).

The second width, Ttf, measured at the tip 50 of the tooth of the final form of the plurality of steering rack teeth is greater than or equal to the first width, Tto, measured at the tip 50 of the initial form of the plurality of steering rack teeth 40. The second height, Hf, measured from the tip 50 of the tooth of the final form of the plurality of steering rack teeth 40 to the base 52 of the final form of the plurality of steering rack teeth 40 is less than the first height, Ho, measured from the tip 50 of the tooth of the initial form of the plurality of steering rack teeth 40 to the base 52 of the initial form of the plurality of steering rack teeth 40. For example, the first height, Ho, of the initial form of the plurality of steering rack teeth 40 may be 110% to 130% of the second height, Hf, of the final form of the plurality of steering rack teeth 40. The second height, Hf, of the final form of the plurality of steering rack teeth 40 is substantially constant across a length of the elongate member 20 that includes the final form of the plurality of steering rack teeth 40.

The second profile formed into the final form of the plurality of steering rack teeth 40 of the first portion 30 of the elongate member body 22 may be different from the first profile cut into the initial form of the plurality of steering rack teeth 40. The cold upsetting process may twist some teeth of the plurality of steering rack teeth 40 to achieve a final pitch and/or helix angle. The profile of the plurality of steering rack teeth 40 determines whether the steering rack 10 includes straight ratio or variable ratio steering rack teeth.

The bottom thickness, Tb, of the initial form of the plurality of steering rack teeth 40 is substantially similar to or the same as the bottom thickness, Tb, of the final form of the plurality of steering rack teeth 40. As such, the bottom thickness of each tooth of the plurality of steering rack teeth 40 remains substantially constant during the cold upsetting process.

The volume of the first configuration of each tooth must be sufficiently large that material can flow along the tooth flank profiles (established by the tooth forming die) in a manner such that the teeth widen while accurate tooth flank surfaces are formed. Consequently, it may be necessary to add up to 30% extra volume to the cut teeth above and beyond the volume of material contained in theoretically accurate teeth that would be machined into a circular rack blank. In other words, the cut tooth forms must include extra material to flow transversely in the die cavity while being adequately and accurately shaped by the die surfaces. This extra material benefits the strength and function of the rack teeth by enabling expansion the face width of the teeth during the forming process.

Referring to FIGS. 1-4, the ramp function 42 of the second portion 32 of the elongate member body 22 of the elongate member 20 is formed as a semi-circular surface form disposed opposite the plurality of steering rack teeth 40. In at least one embodiment, the ramp function 42 may have other geometric features or shapes that enhance supporting of the steering rack 10. The ramp function 42 is formed into the second portion 32 during the cold upsetting process. The ramp function 42 configures the second portion 32 of the elongate member body 22 of the elongate member 20 as a steering rack bearing contact surface.

The ramp function 42 of the second portion 32 of the elongate member body 22 may have an arcuate profile. The ramp function 42 provides a maximum thickness of the of the steering rack 10 having the final form of the plurality of steering rack teeth proximate a center tooth 60 of the plurality of steering rack teeth 40. The maximum thickness of the steering rack 10 is measured from a pitch line 64 of the plurality of steering rack teeth 40 at the center tooth 60 or a tooth space location of the final form of the plurality the steering rack teeth 40 to a point 62 on the ramp function 42 opposite the tip of the center tooth 60 of the final form of the plurality of steering rack teeth 40. A thickness of the steering rack 10 decreases in a direction that extends away from the center tooth 60 towards either the first elongate member end 24 or the second elongate member end 26 due to the shape of the ramp function 42.

The ramp function 42 controls the tooth clearances or tooth interference of the final form of the plurality of steering rack teeth 40 when the steering rack 10 is installed with other components of a steering assembly. The ramp function 42 controls the tooth clearances of the final form of the plurality of steering rack teeth 40 without crowning of the final form of the plurality of steering rack teeth 40 because the final form of the plurality of the steering rack teeth 40 may be designed to have an uncompensated or flat pitch plane across a length of the steering rack 10.

Referring to FIGS. 1 and 4, the plurality of steering rack teeth 40 have a substantially constant height, H, or operating position when the steering rack 10 is disposed against its functional opposite, i.e. pinion. The height, H, is measured from the pitch line 64 of the plurality of steering rack teeth 40 to a tip 50 of a tooth of the plurality of steering rack teeth 40. Adjacent teeth of the plurality of steering rack teeth 40 are spaced apart from each by a desired space width, Wds.

Figure 6:
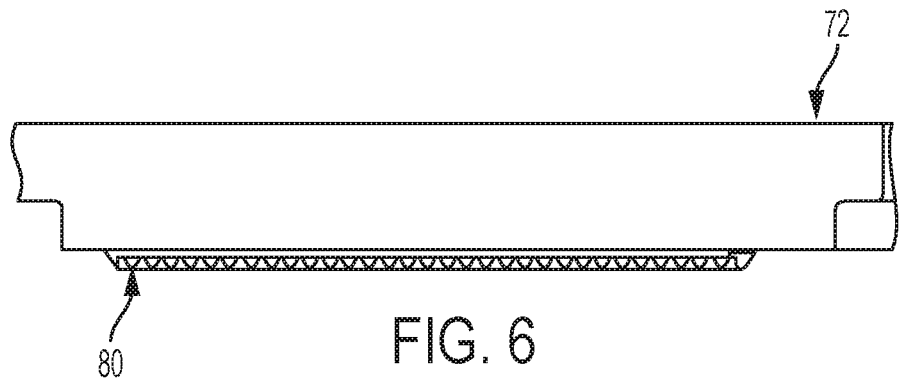
FIG. 6 is an illustrative view of a punch of the press.
Figure 7:
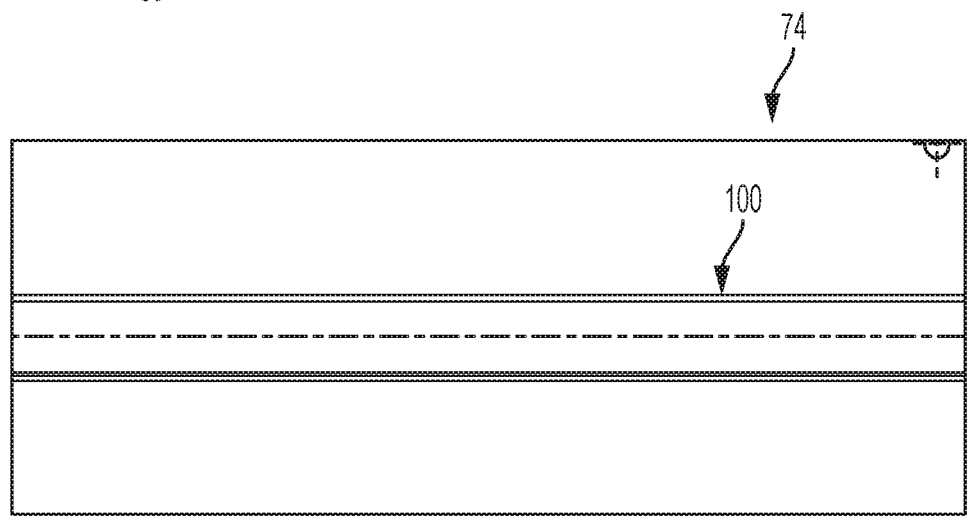
FIG. 7 is an illustrative view of a die of the press.

Referring to FIGS. 5-7, the cold upsetting process may be performed by a press 70. The press 70 includes a punch 72 and a die 74 oriented relative to the punch 72. The die 74 is configured to receive the second portion 32 of the elongate member body 22 of the elongate member 20. The die 74 orients the first portion 30 of the elongate member body 22 of the elongate member 20 having the initial form of the plurality of steering rack teeth 40 towards the punch 72.

The punch 72 is configured to move toward the first portion 30 of the elongate member body 22 of the elongate member 20 having the initial form of the plurality of steering rack teeth 40 to form the final form of the plurality of steering rack teeth 40. The punch 72 is provided with a plurality of tooth cavities 80. The plurality of tooth cavities 80 face towards the initial form of the plurality of steering rack teeth 40 cut into the first portion 30 of the elongate member body 22 of the elongate member 20 that is disposed on the die 74.

The plurality of tooth cavities 80 correspond to the final form of the plurality of steering rack teeth 40. The plurality of tooth cavities 80 are configured to form the initial form of the plurality of steering rack teeth 40 into the final form of the plurality of steering rack teeth 40. The plurality of tooth cavities 80 are provided with a second profile different from the first profile of the initial form of the plurality of steering rack teeth 40.

The punch 72 is attached to a press ram 90. The press ram 90 is configured to selectively lower and raise the punch 72 relative to the die 74. The press ram 90 lowers the punch 72 having the plurality of tooth cavities 80 towards the die 74. The plurality of tooth cavities is 80 are configured to receive the initial form of the plurality of steering rack teeth 40 to cold upset the initial form of the plurality of steering rack teeth 40 into the final form of the plurality of steering rack teeth 40. The plurality of tooth cavities 80 of the punch 72 cold coins each tooth of the initial form of the plurality of steering rack teeth 40 such that each tooth flows within each respective tooth cavity to form each tooth into the final form.

In at least one embodiment, the plurality of tooth cavities 80 of the punch 72 sculpts corners and edges of each tooth of the plurality of steering rack teeth 40. The plurality of tooth cavities 80 provides corner or edge relief as the punch 72 cold upsets the initial form of the plurality of steering rack teeth 40 to the final form of the plurality of steering rack teeth 40. The corner or edge relief forming reduces locally concentrated stresses proximate the tip 50 of each tooth of the final form of the plurality of steering rack teeth 40.

The die 74 receives the second portion 32 of the elongate member body 22 of the elongate member 20. The die 74 defines a groove 100 that receives the second portion 32 of the elongate member body 22 of the elongate member 20. The groove 100 may be configured as a semi-circular groove or another advantageous semi-circular surface form or non-circular surface form. The groove 100 is configured to form the ramp function 42 onto or into the second portion 32 of the elongate member body 22 of the elongate member 20 during the cold upsetting process.

Figure 8:
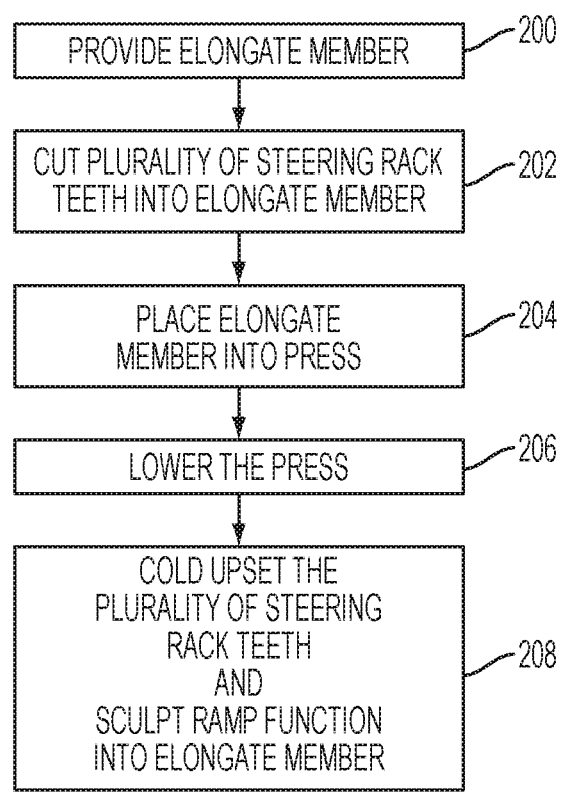
FIG. 8 is a flowchart of a method of manufacturing a steering rack.

The steering rack 10 is manufactured by a process illustrated by the flowchart of FIG. 8. At block 200, the elongate member 20 is provided. At block 202, the initial form of the plurality of steering rack teeth 40 are cut into the first portion 30 of the elongate member body 22 of the elongate member 20.

At block 204, the elongate member 20 having the initial form of the plurality of steering rack teeth 40 cut into the first portion 30 is placed into a press 70. The second portion 32 of the elongate member body 22 of the elongate member 20 is placed into the groove 100 of the die 74 of the press 70. The first portion 30 of the elongate member body 22 of the elongate member 20 faces towards the punch 72 of the press 70.

At block 206, the punch 72 having the plurality of tooth cavities 80 is lowered towards the first portion 30 of the elongate member body 22 of the elongate member 20 having the initial form of the plurality of steering rack teeth 40. At block 208, the initial form of the plurality of steering rack teeth 40 are cold upset within a corresponding cavity of the plurality of tooth cavities 80 of the punch 72 into the final form of the plurality of steering rack teeth 40. Substantially simultaneously with the cold upsetting of the initial form of the plurality of steering rack teeth 40, the groove 100 of the die 74 sculpts or forms the ramp function 42 into the second portion 32 of the elongate member body 22 of the elongate member 20.

The punch 72 and the die 74 are able to shape the initial form of the plurality of steering rack teeth 40 into the final form of the plurality steering rack teeth 40 without generating high press loads or die stresses due to the cutting of the initial form of the plurality steering rack teeth 40 prior to pressing.

While the present disclosure has been described in detail in connection with only a limited number of embodiments, it should be readily understood that the present disclosure is not limited to such disclosed embodiments. Rather, the present disclosure may be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments or combinations of the described embodiments. Accordingly, the present disclosure is not to be seen as limited by the foregoing description.

Having thus described the present disclosure, it is claimed:

1. A method of manufacturing a steering rack, comprising:
    cutting a plurality of steering rack teeth each having a first tooth width and a first tooth height into a first portion of an elongate member to define an initial tooth form;
    placing the elongate member having the plurality of steering rack teeth into a press, the press having:
        a die configured to receive a second portion of the elongate member, and
        a punch provided with a plurality of tooth cavities that face towards the first portion of the elongate member;
    lowering the punch towards the first portion of the elongate member having the plurality of steering rack teeth in the initial tooth form;
    cold upsetting the initial tooth form of the plurality of steering rack teeth within a corresponding cavity of the plurality of tooth cavities of the punch, wherein each tooth of the plurality of steering rack teeth upset by the punch has a second tooth width and second tooth height, and the second tooth width is greater than the first tooth width, the second tooth width and the second tooth height defining a final tooth form; and
    forming an arcuate, curved ramp onto the second portion of the elongate member with a groove of the die, wherein the arcuate, curved ramp is formed into the second portion substantially simultaneously with forming of the final tooth form of the plurality of steering rack teeth into the first portion and curves in a longitudinal direction of the elongate member, the second portion disposed on an opposite side of the steering rack relative to the first portion, the steering rack having a maximum thickness proximate a center tooth of the plurality of steering rack teeth.

2. The method of claim 1, wherein the second tooth height is less than the first tooth height.

3. The method of claim 1, wherein the arcuate, curved ramp of the second portion of the elongate member defines a steering rack bearing contact surface.

* * * * *